United States Patent
Kim et al.

(10) Patent No.: US 9,618,282 B2
(45) Date of Patent: Apr. 11, 2017

(54) RADIATOR FOR VEHICLE

(71) Applicants: Hyundai Motor Company, Seoul (KR); Kia Motors Corporation, Seoul (KR); Halla Visteon Climate Control Corp., Daejeon (KR)

(72) Inventors: Jae Yeon Kim, Hwaseong-si (KR); Ji Hun Han, Daejeon (KR); Hyun Keun Shin, DaeJeon (KR)

(73) Assignees: Hyundai Motor Company, Seoul (KR); Kia Motors Corporation, Seoul (KR); Halla Visteon Climate Control Corp., Daejeon (KR)

( * ) Notice: Subject to any disclaimer, the term of this patent is extended or adjusted under 35 U.S.C. 154(b) by 492 days.

(21) Appl. No.: 14/144,495

(22) Filed: Dec. 30, 2013

(65) Prior Publication Data

US 2014/0360705 A1    Dec. 11, 2014

(30) Foreign Application Priority Data

Jun. 7, 2013 (KR) .................. 10-2013-0065509
Jun. 27, 2013 (KR) .................. 10-2013-0074847

(51) Int. Cl.
*F28F 9/02* (2006.01)
*F28D 1/04* (2006.01)
(Continued)

(52) U.S. Cl.
CPC .......... *F28F 9/0234* (2013.01); *F28D 1/0435* (2013.01); *F28D 1/05366* (2013.01);
(Continued)

(58) Field of Classification Search
CPC .. F01P 2003/182; F01P 2003/185; F01P 3/12; F01P 2060/04; F01P 2060/045;
(Continued)

(56) References Cited

U.S. PATENT DOCUMENTS 4,620,509 A * 11/1986 Crofts .................. F01P 3/20 123/41.1
6,772,602 B2 * 8/2004 Vetter ................ B60H 1/00335 62/239

(Continued)

FOREIGN PATENT DOCUMENTS

JP    11-192833 A    7/1999
JP    2006-199206 A    8/2006
(Continued)

*Primary Examiner* — Tho V Duong
(74) *Attorney, Agent, or Firm* — Morgan, Lewis & Bockius LLP

(57) ABSTRACT

A vehicle radiator may include a first header tank partitioned through a first barrier rib that is integrally formed at the inside to store a coolant to form a first chamber and a second chamber inside the first header tank, a second header tank disposed apart by a predetermined gap from the first header tank and partitioned through a second barrier rib that is integrally formed therein to correspond to the first barrier rib to form a third chamber and a fourth chamber, a plurality of first and second tubes that are mounted in a vertical direction at each separated position of each inside surface of the first header tank and the second header tank, heat diffusion fins, each of which are formed between the first tubes and the second tubes; and a condenser that is provided at the inside of the fourth chamber in the second header tank.

18 Claims, 16 Drawing Sheets

(51) Int. Cl.
*F28D 1/053* (2006.01)
*F28F 1/12* (2006.01)
*F28D 21/00* (2006.01)

(52) U.S. Cl.
CPC ...... *F28F 1/126* (2013.01); *F28D 2021/0082* (2013.01); *F28D 2021/0084* (2013.01); *F28D 2021/0089* (2013.01); *F28D 2021/0094* (2013.01); *Y02T 10/146* (2013.01)

(58) Field of Classification Search
CPC .... F28D 1/0461; F28D 1/0435; F28D 1/0426; F28D 1/05366; F28D 2021/0084; F28D 2021/0089; F28D 2021/0082; F28D 2021/0094; Y02T 10/146; F28F 9/0234; F28F 1/126
USPC ........................................................ 165/140
See application file for complete search history.

(56) References Cited

U.S. PATENT DOCUMENTS

| | | | | |
|---|---|---|---|---|
| 7,406,929 B2* | 8/2008 | Hassdenteufel | ......... | F01P 3/20 123/41.1 |
| 7,490,659 B2* | 2/2009 | Kwon | ................... | F28D 1/0443 165/140 |
| 7,669,558 B2* | 3/2010 | Claypole | ................ | B60K 11/02 123/41.51 |
| 8,430,151 B2* | 4/2013 | Kim | .......................... | F01P 3/18 165/174 |
| 2005/0257921 A1* | 11/2005 | Hu | ........................ | F28D 1/0443 165/140 |
| 2006/0113068 A1* | 6/2006 | Desai | .................... | F28D 1/0417 165/140 |
| 2010/0126692 A1* | 5/2010 | Min | ................... | B60H 1/00328 165/41 |
| 2011/0232868 A1* | 9/2011 | Iwasaki | ................. | F28D 1/0452 165/104.13 |

FOREIGN PATENT DOCUMENTS

| | | |
|---|---|---|
| JP | 2006-207377 A | 8/2006 |
| KR | 1998-055280 U | 10/1998 |
| KR | 20-0211882 Y1 | 2/2001 |
| KR | 10-2013-0054048 A | 5/2013 |

* cited by examiner

RADIATOR FOR VEHICLE

CROSS-REFERENCE TO RELATED APPLICATION

The present application claims priority to Korean Patent Application Nos. 10-2013-0074847 and 10-2013-0065509 respectively filed on Jun. 27, 2013 and Jun. 7, 2013, the entire contents of which is incorporated herein for all purposes by this reference.

BACKGROUND OF THE INVENTION

Field of the Invention

The present invention relates to a vehicle radiator.

Description of Related Art piston to a driving wheel by ejecting mixed air of fuel and air into an engine cylinder and has a cooling apparatus such as a water jacket in order for an engine that obtains an output by explosion to cool a high heat by explosion, and a radiator performs a function that cools again a coolant, having circulated the water jacket.

Radiators having such a function are classified into an air-cooled method and a water-cooled method according to a cooling method and are classified into a cross-flow radiator and a down-flow radiator according to a configuration form.

The cross-flow radiator and the down-flow radiator that are classified according to a configuration form are determined according to a flow direction of a coolant, and in a radiator according to the conventional art, an inlet tank and an outlet tank in which a coolant is injected and exhausted are separately disposed, tubes that connect the inlet tank and the outlet tank are mounted to stack and thus a coolant is flowed, and the radiator has a structure that cools a coolant that is flowed through heat exchange with outdoor air.

Here, in the cross-flow radiator, as the inlet tank and the outlet tank are disposed at the left side and the right side, tubes are mounted to laterally stack and thus a coolant is cooled while laterally circulating.

In the down-flow radiator, as inlet and outlet tanks are vertically disposed, tubes that connect each tank are mounted to stack in a vertical direction and thus a coolant is cooled while circulating in a vertical direction.

A radiator formed in this way is disposed at the front side in an engine compartment of a vehicle so that cold outdoor air that is injected while traveling and a coolant exchange a heat.

Nowadays, an intercooler that cools and supplies air that is compressed in a turbine of a turbocharger that is applied to improve an output of an engine to the engine is applied.

Such an intercooler is classified into an air-cooled method or a water-cooled method, and in order to improve fuel consumption by improvement of a cooling performance and improvement of a turbo rack, application of the water-cooled method rather than the air-cooled method increases.

In an intercooler to which a water-cooled method is applied, a coolant that is cooled through an intercooler radiator separate from a radiator that supplies a coolant to an engine is injected and thus compressed air is cooled.

However, the foregoing conventional vehicle radiators are formed with an engine radiator and an intercooler radiator, respectively, and at the front side of the vehicle, as the engine radiator and the intercooler radiator are applied parallel at the front side or the rear side, in a small and narrow engine compartment in which package is enlarged, there is a problem that a restriction of installation space occurs.

Further, as space between a back beam and an engine compartment reduces, a collision performance is deteriorated, and heights of tubes and heat diffusion fins of each radiator are different and thus when outdoor air that is injected into the front side of the vehicle passes through each radiator, ventilation resistance is excessively formed and thus there is a problem that a heat releasing performance of the radiator is deteriorated.

Further, when a heat releasing performance of the radiator is deteriorated, a coolant cannot be cooled to a request temperature and thus entire cooling efficiency is deteriorated, and as a coolant in which cooling is appropriately performed is supplied to an engine and an intercooler, the engine and the intercooler cannot be appropriately cooled and thus there is a problem that an entire cooling performance of the vehicle is deteriorated.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a vehicle radiator having advantages of improving a heat releasing performance by reducing vehicle package and by reducing ventilation resistance by disposing tubes in which each coolant is flowed on the same line, by forming in an integral form to supply a coolant to each header tank by partitioning the inside of each header tank and by installing a condenser that condenses a refrigerant at the inside of a header tank.

In an aspect of the present invention, a vehicle radiator to cool a coolant that is flowed at an inside through heat exchange with outdoor air, may include a first header tank that is partitioned through a first barrier rib that is integrally formed at the inside so as to store a coolant to form a first chamber and a second chamber inside the first header tank, wherein the first header is configured to inject a coolant into the first chamber and the second chamber or to exhaust a coolant from the first chamber and the second chamber, second header tank that is disposed apart by a predetermined gap from the first header tank and that is partitioned through a second barrier rib that is integrally formed therein to correspond to the first barrier rib to form a third chamber and a fourth chamber, wherein the second header tank is configured to inject a coolant into the third chamber and the fourth chamber from the first header tank or to exhaust a coolant from the first header tank to the third chamber and the fourth chamber, a plurality of first and second tubes that are mounted in a vertical direction at each separated position of each inside surface of the first header tank and the second header tank, wherein the plurality of first and second tubes are configured to connect the first chamber of the first header tank and the third chamber of the second header tank and to connect the second chamber of the first header tank and the fourth chamber of the second header tank, heat diffusion fins, each of which are formed between the first tubes and the second tubes, and a condenser that is provided at the inside of the fourth chamber in the second header tank, wherein the condenser is configured to circulate a refrigerant through a refrigerant pipe and to condense the refrigerant through heat exchange with a coolant that passes through the fourth chamber.

The vehicle radiator may include an oil cooler that is provided at the inside of the first chamber in the first header tank and that is connected to an automatic transmission through an oil pipe to circulate transmission oil and that cools the transmission oil through heat exchange with a coolant that passes through the first chamber, wherein the first chamber and the second chamber are partitioned in different sizes, and wherein the third chamber and the fourth chamber are partitioned in different sizes.

The first chamber is formed in larger width than a width of the second chamber, along a thickness direction of the radiator, wherein the fourth chamber is formed in a larger width than a width of the third chamber, along a thickness direction of the radiator.

The second chamber and the third chamber are formed in a same width along a thickness direction of the radiator, and the first chamber and the fourth chamber are formed in a same width along a thickness direction of the radiator.

The first and third chambers are formed in a same width along a thickness direction of the radiator, and the second and fourth chambers are formed in a same width along a thickness direction of the radiator, wherein the width of the second and fourth chambers is larger than the width of the first and third chambers.

The second tubes are formed in a width different from a width of the first tube.

The first header tank may have a first outlet that exhausts a coolant that is injected into the first chamber in a lower portion of the first chamber.

The second header tank may have a first inlet that injects a coolant into the third chamber in an upper portion of the third chamber.

The first header tank may have a second inlet and a second outlet that inject and exhaust a coolant in an upper portion and a lower portion, respectively, of the second chamber.

In the first header tank, a diaphragm that prevents mixing of a coolant that is injected into the second chamber by partitioning the second chamber in a vertical direction is integrally formed between the second inlet and the second outlet.

The coolant that is injected into the second chamber is flowed to the fourth chamber through the second tubes in an upper portion based on the diaphragm and is flowed from the fourth chamber to the second chamber through the second tubes in a lower portion.

Each of the first tubes and each of the second tubes are disposed on a same line in a vertical direction of the first header tank and the second header tank.

The heat diffusion fins are disposed to may have a same bent position between the first tubes and between the second tubes.

The heat diffusion fins each are mounted in the first tubes and the second tubes in a state that are separated to correspond to each of the first tubes and each of the second tubes that are separated in a thickness direction of the radiator.

The heat diffusion fins interconnect each of the first tubes and each of the second tubes separated in a thickness direction of the radiator.

The coolant that is cooled while flowing in the first chamber and the third chamber is circulated to an engine of an internal combustion engine vehicle, an engine of a hybrid vehicle, or a driving part of an environmentally-friendly vehicle.

The coolant that is cooled while flowing in the second chamber and the fourth chamber is circulated to an intercooler of an internal combustion engine vehicle or an electric power part of an environmentally-friendly vehicle.

The first header tank is disposed asymmetrically to the second header tank at a position that is moved to an engine compartment side further than the second header tank so as to reduce a gap between the first tubes and the second tubes.

As described above, in a vehicle radiator according to various aspects of the present invention, by partitioning the inside of each header tank, the vehicle radiator is formed in an integral form to supply each coolant to an engine and an intercooler and has a condenser that condenses a refrigerant at the inside of a header tank and thus vehicle package can be reduced, and by decreasing a weight and a size, a production cost can be reduced. In addition, by installing an oil cooler that cools transmission oil at the inside of one header tank and installing a condenser that condenses a refrigerant at the inside of another header tank, vehicle package can be further reduced, and a production cost can be further reduced by decreasing a weight and a size.

Further, use of space within an engine compartment can be improved through package reduction, and by securing enough space between a back beam and an engine compartment, a collision performance can be improved.

Further, by disposing tubes in which an engine coolant and an intercooler coolant each are flowed on the same line, ventilation resistance can be reduced and thus an entire heat releasing performance can be improved.

Further, by cooling a coolant to a request temperature through improvement of a heat releasing performance, a cooling performance of an engine and an intercooler can be improved without enlargement of a size and a capacity.

Further, special utility of an engine compartment may be improved by reducing vehicle package, collision performance may be improved by securing sufficient space.

By forming a vehicle radiator in a water-cooled method by installing an oil cooler and a condenser at the inside of a header tank, cooling efficiency of a refrigerant and transmission oil can be improved.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
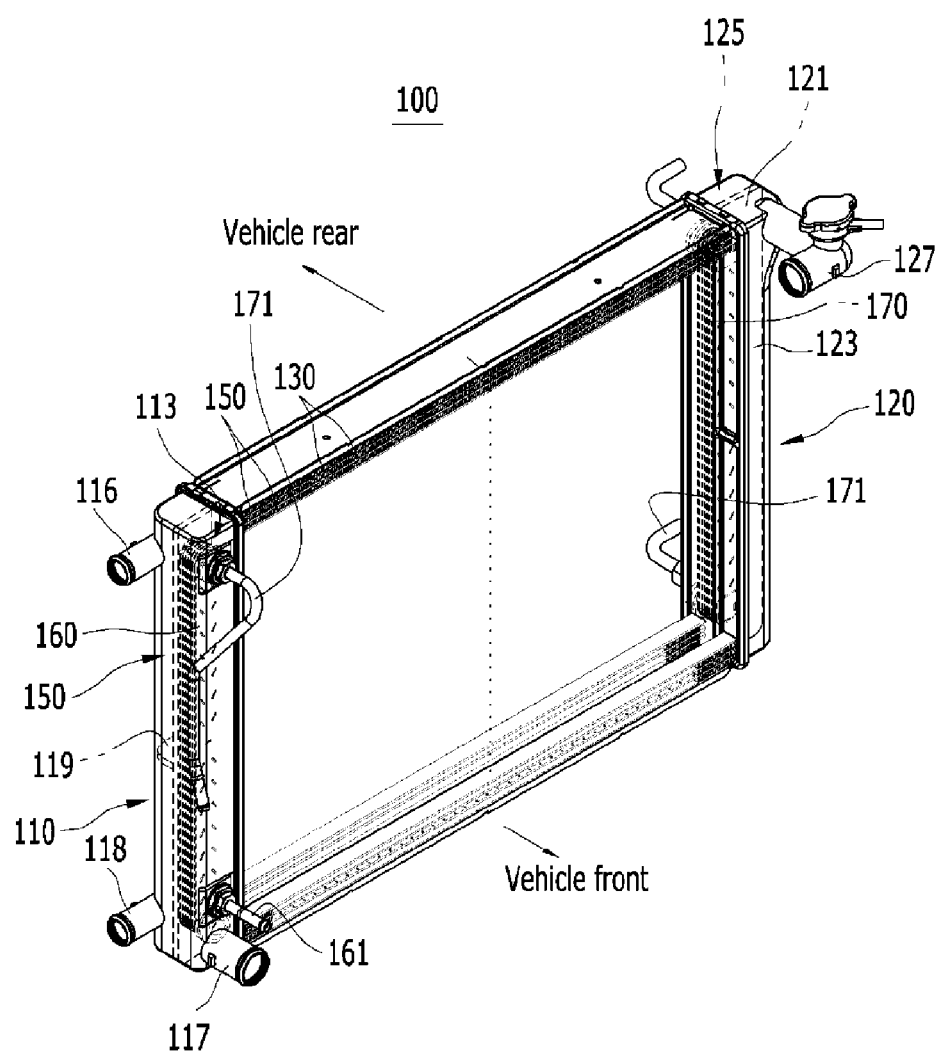
FIG. 1 is a front perspective view of a vehicle radiator according to various exemplary embodiments of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

An exemplary embodiment of the present invention will hereinafter be described in detail with reference to the accompanying drawings.

A configuration of exemplary embodiments and drawings described in this specification is an exemplary embodiment of the present invention and does not entirely represent the spirit and scope of the present invention and therefore it should be clearly understood that at an application time point of the present invention, various equivalents and exemplary variation that can replace the configuration may exist.

In addition, in the entire specification, unless explicitly described to the contrary, the word "include" and variations such as "includes" or "including", will be understood to imply the inclusion of stated elements but not the exclusion of any other elements.

In addition, the terms "unit, "means", "-er", and "member" described in the specification mean units for processing at least one function and operation.

Figure 2:
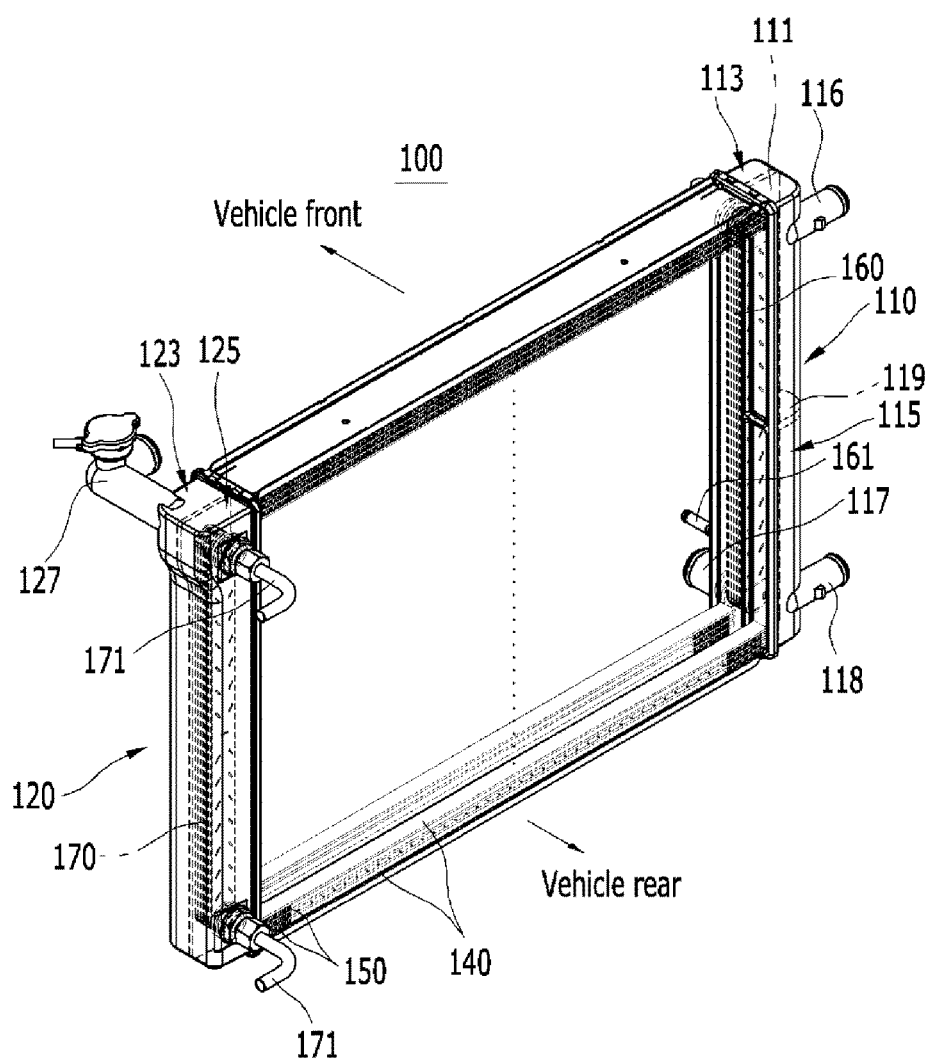
FIG. 2 is a rear perspective view of a vehicle radiator according to various exemplary embodiments of the present invention.
Figure 3:
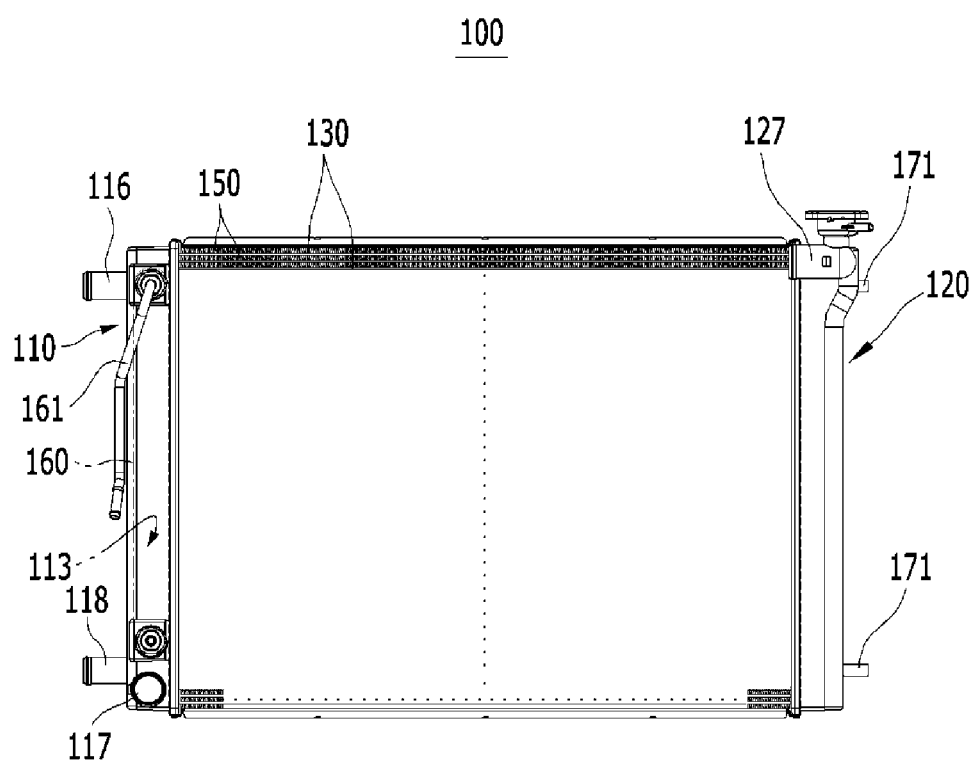
FIG. 3 is a front view of a vehicle radiator according to various exemplary embodiments of the present invention.
Figure 4:
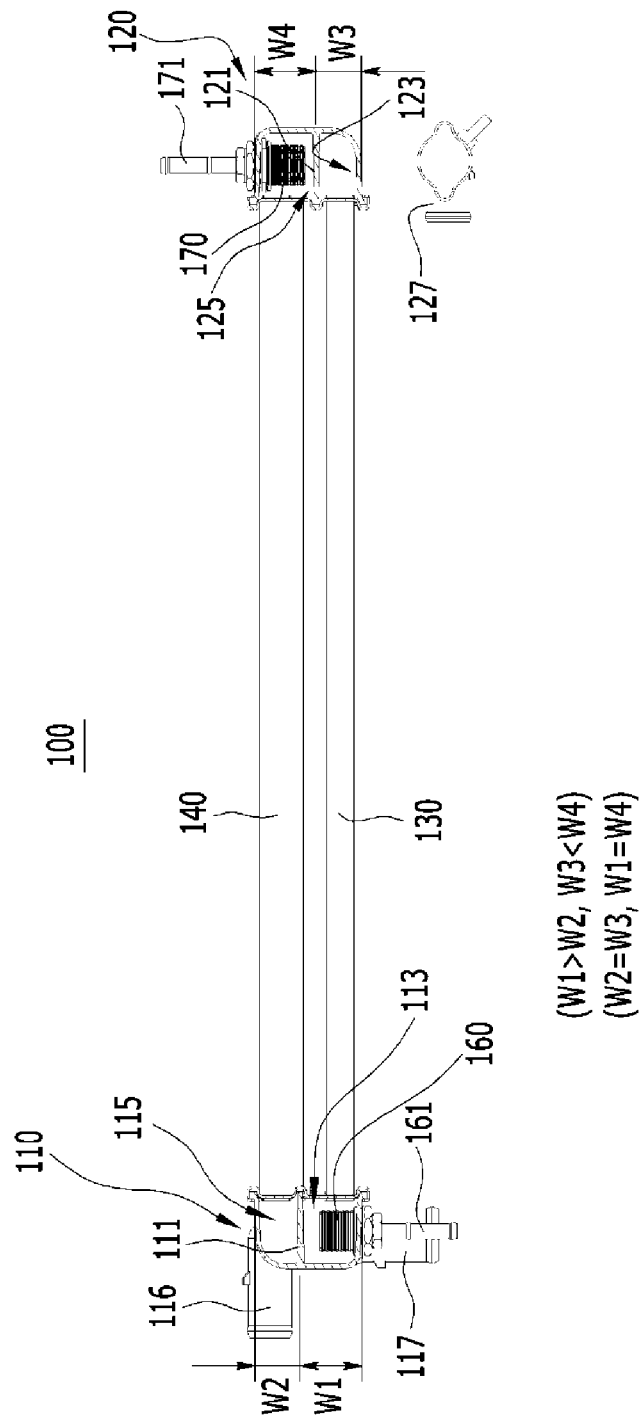
FIG. 4 is a top plan view of a vehicle radiator according to various exemplary embodiments of the present invention.
Figure 5:
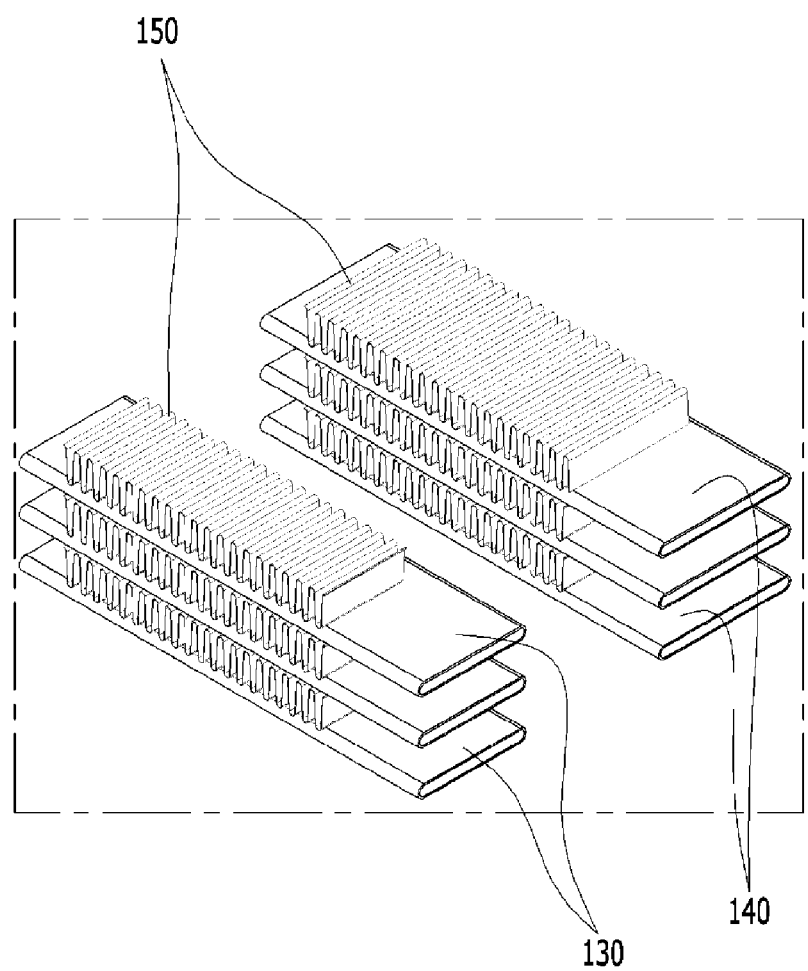
FIG. 5 is a perspective view illustrating a disposition state of tubes and heat diffusion fins in a vehicle radiator according to various exemplary embodiments of the present invention.

FIG. 1 and FIG. 2 are front and rear perspective views of a vehicle radiator according to a first exemplary embodiment of the present invention, FIGS. 3 and 4 are a front view and a top plan view of a vehicle radiator according to a first exemplary embodiment of the present invention, and FIG. 5 is a perspective view illustrating a disposition state of tubes and heat diffusion fins in a vehicle radiator according to a first exemplary embodiment of the present invention.

Firstly, a first exemplary embodiment of the present invention and its exemplary variation are described with reference to FIG. 1 to FIG. 8.

Referring to the drawings, a vehicle radiator 100 according to an exemplary embodiment of the present invention is formed in an integral form to supply a coolant by partitioning the inside of each of header tanks 110 and 120 and has an oil cooler 160 that cools transmission oil at the inside of one header tank and has a condenser 170 that condenses a refrigerant at the inside of another header tank and thus vehicle package is reduced, and by disposing tubes in which each coolant is flowed on the same line, ventilation resistance is reduced and thus the vehicle radiator 100 has a structure that can improve a heat releasing performance.

For this purpose, the vehicle radiator 100 according to a first exemplary embodiment of the present invention is formed at the front side of the vehicle cools a coolant that is flowed at the inside through outdoor air that is injected while traveling and wind that is ventilated from a cooling fan that is mounted at the non-illustrated engine compartment side.

The vehicle radiator 100 includes a first header tank 110, a second header tank 120, first and second tubes 130 and 140, heat diffusion fins 150, an oil cooler 160, and a condenser 170, as shown in FIGS. 1 to 4.

First, the first header tank 110 is partitioned in different sizes through a first barrier rib 111 that is integrally formed at the inside so as to store a coolant and thus a first chamber 113 and a second chamber 115 are formed.

In the first header tank 110, a coolant is injected into the first and second chambers 113 and 115 or is exhausted from the first and second chambers 113 and 115.

Here, in the first header tank 110, in a lower portion of the front side of the first chamber 113, a first outlet 117 that exhausts a coolant that is injected into the first chamber 113 is formed.

Further, in the first header tank 110, a second inlet 116 that injects a coolant and a second outlet 118 that exhausts a coolant are formed in an upper portion and a lower portion, respectively, of the outside of the second chamber 115 in a width direction of the radiator.

The first chamber 113 may have a width W1 larger than a width W2 of the second chamber 115, along a thickness direction of the radiator.

In the present exemplary embodiment, the second header tank 120 is disposed apart by a predetermined gap from the first header tank 110 and is partitioned in different sizes through a second barrier rib 121 that is integrally formed at the inside to correspond to the first barrier rib 111, and a third chamber 123 and a fourth chamber 125 are thus formed.

The second header tank 120 exhausts a coolant that is injected into the third chamber 123 to the first chamber 113 of the first header tank 110, injects a coolant that is injected into the second chamber 115 of the first header tank 110 into the fourth chamber 125, and exhausts a coolant from the fourth chamber 125 to the second chamber 115.

Here, the second header tank 120 has a first inlet 127 that injects a coolant into the third chamber 123 in an upper portion of the front side of the third chamber 123.

Further, the fourth chamber 125 may have a width W3 larger than a width W4 of the third chamber 123, along a thickness direction of the radiator.

That is, in the first and second header tanks 110 and 120, the second chamber 115 and the third chamber 123 are formed in the same width (W2=W3) based on a thickness direction of the radiator, and the first chamber 113 and the fourth chamber 125 are formed in the same width (W1=W4) based on a thickness direction of the radiator.

In the first header tank 110 and the second header tank 120 that are formed in this way, the first chamber 113 and the third chamber 123 are disposed toward the front side of the vehicle, and the second chamber 115 and the fourth chamber 125 are disposed toward the rear side of the vehicle.

In the present exemplary embodiment, the first header tank 110 is integrally formed with a diaphragm 119 that prevents a coolant that is injected into the second chamber 115 from mixing with a coolant that is injected from the fourth chamber 125 into the second chamber 115 by partitioning the second chamber 115 in a vertical direction between the second inlet 116 and the second outlet 118.

Accordingly, a coolant that is injected into the second inlet 116 is prevented from being directly exhausted to the second outlet 118 by the diaphragm 119.

In the present exemplary embodiment, the first tube 130 connects the first chamber 113 of the first header tank 110 and the third chamber 123 of the second header tank 120.

The second tube 140 connects the second chamber 115 of the first header tank 110 and the fourth chamber 125 of the second header tank 120.

The first tube 130 and the second tube 140 are mounted in plural in a vertical direction at a separated position of each inside surface of the first header tank 110 and the second header tank 120.

Here, the first tube 130 and the second tube 140 are mounted apart by a uniform gap in a vertical direction of the first header tank 110 and the second header tank 120.

Further, the first tube 130 may have a width of about 14 mm, and the second tube 140 may have a width of about 18 mm.

Accordingly, a coolant that passes through the second tube 140 is flowed with a much flow quantity than that of a coolant that is flowed through the first tube 130.

In the present exemplary embodiment, it is described that a width of the second tube 140 is formed longer than that of the first tube 130 and a flow quantity of a coolant is differently flowed, but the present invention is not limited thereto and a length of each of the tubes 130 and 140 may be changed and applied according to a heat releasing request amount of an engine and an intercooler and thus a flow quantity of a flowed coolant can be adjusted.

Here, the first tube 130 and the second tube 140 connect the corresponding first and third chambers 113 and 123 in a vertical direction of the first header tank 110 and the second header tank 120, and are disposed on the same line while connecting the second and fourth chambers 115 and 125, respectively.

In the present exemplary embodiment, a coolant that is injected into the second chamber 115 through the second inlet 116 is flowed to the fourth chamber 125 through the second tube 140 in an upper portion based on the diaphragm 119, and in a lower portion, a coolant that is injected into the second chamber 115 through the second inlet 116 is flowed from the fourth chamber 125 to the second chamber 115 through the second tube 140.

The heat diffusion fins 150 are formed between the first tubes 130 and the second tubes 140 to emit a heat transferred from a coolant that is flowed through the first tube 130 and the second tube 140 to the outside, as shown in FIG. 5.

Here, the heat diffusion fins 150 are disposed to have the same bent position between the each first tube 130 and the each second tube 140.

The heat diffusion fins 150 each are separately mounted in the first tube 130 and the second tube 140 in an individually separated state to correspond to the each first tube 130 and the each second tube 140 that are separated in a thickness direction of the radiator.

That is, in the present exemplary embodiment, the first and second tubes 130 and 140 are disposed on the same line in a vertical direction of the radiator at a separated position in a front-rear direction of the vehicle according to each of the chambers 113, 115, 123, and 125 between the first header tank 110 and the second header tank 120.

The heat diffusion fins 150 are disposed to have the same bent position between the first tubes 130 and between the second tubes 140.

Accordingly, while the vehicle travels, when injected outdoor air is injected into the radiator 100 and passes through the radiator 100, ventilation resistance of outdoor air is decreased and thus outdoor air is more smoothly flowed. Therefore, an entire heat releasing performance of the radiator 100 is improved and thus cooling efficiency of the coolant can be improved.

In the present exemplary embodiment, the oil cooler 160 is provided at the inside of the first chamber 113 that is disposed at the front side of the vehicle in the first header tank 110.

The oil cooler 160 is connected to a non-illustrated automatic transmission through an oil pipe 161 at the inside of the first chamber 113 having a large width W1 and thus transmission oil is circulated therein, and the oil cooler 160 cools transmission oil through heat exchange with a coolant that passes through the first chamber 113.

The transmission oil that is cooled through the oil cooler 160 is supplied to the non-illustrated automatic transmission to be complete cooling of the automatic transmission and is circulated by being injected again into the oil cooler 160.

The condenser 170 is provided at the inside of the fourth chamber 125 that is disposed toward the rear side of the vehicle in the second header tank 120.

The condenser 170 is provided at the inside of the fourth chamber 125 having a large width W4 to circulate a refrigerant that is supplied from a non-illustrated compressor through a refrigerant pipe 171, and the condenser 170 condenses the refrigerant through heat exchange with a coolant that passes through the fourth chamber 125.

Here, the condenser 170 exchanges a heat with a refrigerant that is circulated at the inside through a cooled coolant that is injected from the second chamber 115 and that is injected into the fourth chamber 125 in a state that exchanges a heat with outdoor air while passing through the second tube 140.

The refrigerant that is cooled and condensed through the condenser 170 is supplied to an evaporator and is circulated by injecting again into the condenser 170 via a compressor from the evaporator.

Here, as a width of the second tubes 140 that connect the second chamber 115 and the fourth chamber 125 is formed longer than that of the first tubes 130, a flow quantity of a flowed coolant increases and thus cooling efficiency of the condenser 170 that is installed within the fourth chamber 125 can be improved.

Because the oil cooler 160 can satisfy heat exchange efficiency with a coolant flow quantity smaller than that of the condenser 170, the oil cooler 160 can efficiently cool transmission oil.

In the radiator 100 that is formed in this way, a coolant that is cooled through heat exchange with outdoor air while passing through the each first tube 130 between the first chamber 113 and the third chamber 123 may be circulated to an engine of a non-illustrated internal combustion engine vehicle or a driving part of an environmentally-friendly vehicle.

A coolant that is cooled through heat exchange with outdoor air while passing through the each second tube 140 between and the second chamber 115 and the fourth chamber 125 may be circulated to an intercooler of a non-illustrated internal combustion engine vehicle or an electric power part of an environmentally-friendly vehicle.

That is, the vehicle radiator 100 according to an exemplary embodiment of the present invention may be formed to supply a coolant to an engine and an intercooler in an internal combustion engine vehicle, and in an environmentally-friendly vehicle such as an electric vehicle and a hybrid vehicle, as the vehicle radiator 100 has a configuration to supply a coolant to a driving part and an electrical equipment, the vehicle radiator 100 can be applied to both the vehicle of the internal combustion engine and the environmentally-friendly vehicle.

Hereinafter, an operation and function of the vehicle radiator 100 according to an exemplary embodiment of the present invention will be described.

Figure 6:
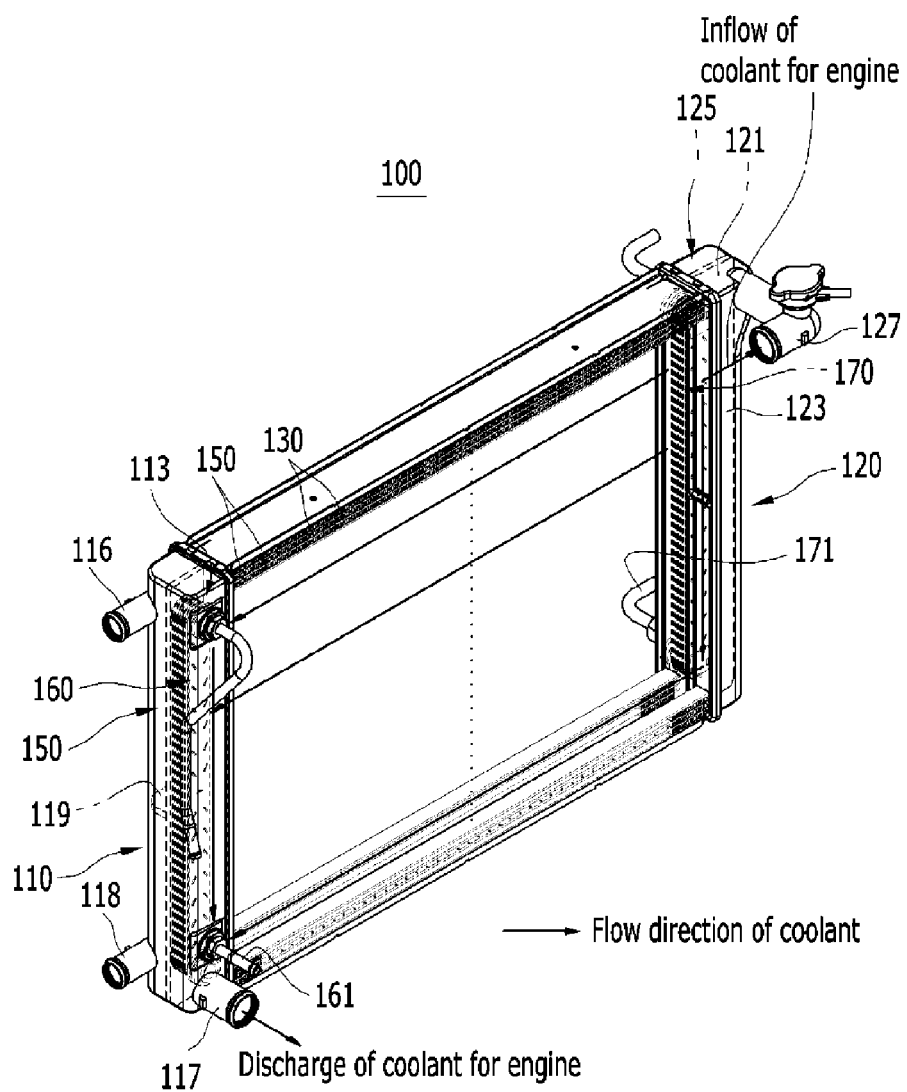
FIGS. 6 and 7 are perspective views illustrating a flow of each coolant in a vehicle radiator according to various exemplary embodiments of the present invention.
Figure 7:
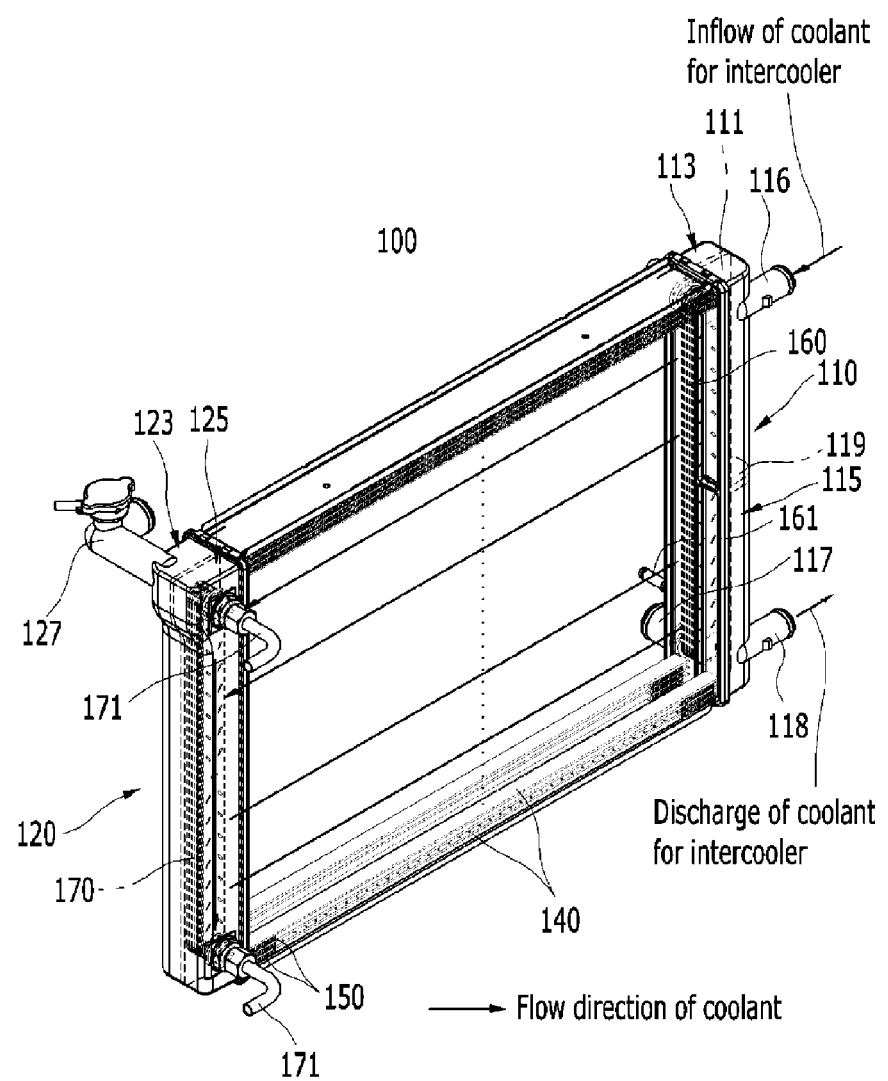

FIG. 6 and FIG. 7 are perspective views illustrating a flow of a coolant in a vehicle radiator according to an exemplary embodiment of the present invention.

Referring to FIG. 6, a coolant that cools an engine of an internal combustion engine or a driving part of an environmentally-friendly vehicle is injected into the third chamber 123 through a first inlet 127 that is formed in an upper portions of the third chamber 123 of the second header tank 120.

Such a coolant is cooled through heat exchange with outdoor air while being flowed to the first chamber 113 along the first tubes 130 from the third chamber 123 and is again supplied to an engine of an internal combustion engine or a driving part of an environmentally-friendly vehicle through the second outlet 117 that is formed in a lower portion of the first chamber 113 of the first header tank 110.

In this case, a coolant in which cooling is complete, which is injected into the first chamber 113 cools transmission oil while exchanging a heat with transmission oil that passes through the inside of the oil cooler 160 that is provided at the inside of the first chamber 113.

A coolant that cools an intercooler or an electrical equipment of the environmentally-friendly vehicle is injected into the second inlet 116 that is formed in an upper portion of the second chamber 115 of the first header tank 110, as shown in FIG. 7.

The coolant that is injected into the second inlet 116 is injected into the fourth chamber 125 in a state that is firstly cooled through heat exchange with outdoor air along the second tubes 140 from an upper portion of the second chamber 115 to the diaphragm 119.

The coolant that is injected into the fourth chamber 125 condenses the refrigerant while exchanging a heat with a refrigerant that passes through the inside of the condenser 170 that is provided at the inside of the fourth chamber 125.

Thereafter, the coolant is secondarily cooled through heat exchange with outdoor air while being flowed again from the fourth chamber 125 to the second chamber 115 along the second tubes 140 that are positioned in a lower portion based on the diaphragm 119 of the second chamber 115.

The coolant in which cooling complete, which is injected into the second chamber 115 is exhausted through the second outlet 118 that is positioned in a lower portion of the second chamber 115 and is again supplied to the intercooler or the electrical equipment of the environmentally-friendly vehicle.

That is, each coolant that cools the engine and the intercooler, or the driving part and the electrical equipment of the environmentally-friendly vehicle is cooled through heat exchange with outdoor air while repeatedly performing the foregoing operation.

Here, the first and second tubes 130 and 140 each are disposed on the same line, and bent positions of the heat diffusion fins 150 that are positioned between the tubes 130 and 140 are the same and thus ventilation resistance is decreased, and outdoor air is thus more smoothly injected into the radiator 100.

Accordingly, a heat releasing performance of the radiator 100 is improved by smooth injection of outdoor air according to reduction of ventilation resistance of outdoor air.

Therefore, when the vehicle radiator 100 according to a first exemplary embodiment of the present invention having the foregoing configuration is applied, by partitioning the inside of the first and second header tanks 110 and 120 in different sizes, by forming the vehicle radiator 100 in an integral form so as to supply each coolant to the engine and the intercooler, by installing a oil cooler that cools transmission oil at the inside of the first chamber 113 of the first header tank 110, and by installing a condenser that condenses a refrigerant at the inside of the fourth chamber 125 of the second header tank 120, vehicle package can be reduced, and a weight and a size thereof can be reduced.

Further, the radiator 100 improves space use of the inside of an engine compartment through package reduction, and by securing enough space between a back beam and the engine compartment, a collision performance can be improved.

Further, as the first tubes 130 and the second tubes 140 are disposed at the same line along thickness direction of the radiator while connecting corresponding chambers 113, 115, 123, and 125, respectively, when outdoor air is injected, ventilation resistance is reduced and thus an entire heat releasing performance can be improved.

Further, by cooling the coolant to a request temperature through improvement of a heat releasing performance of the radiator 100, a cooling performance of the engine and the intercooler can be improved without enlargement of a size and a capacity.

By forming the vehicle radiator in a water-cooled method by installing the oil cooler 160 and the condenser 170 at the inside of a header tank, cooling efficiency of a refrigerant and transmission oil can be improved.

A vehicle radiator 200 according to a variation of a first exemplary embodiment of the present invention will be described with reference to FIG. 8.

Figure 8:
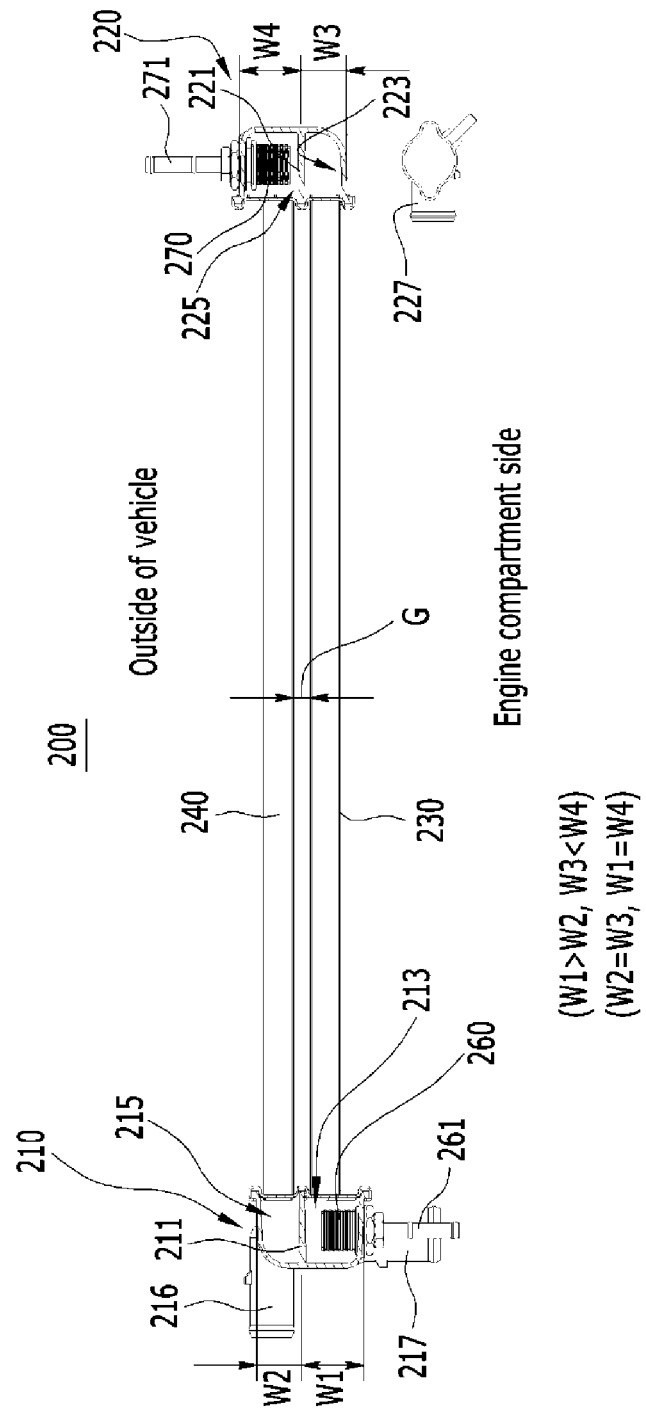
FIG. 8 is a top plan view of a vehicle radiator according to a variation of various exemplary embodiments of the present invention.

FIG. 8 is a top plan view of a vehicle radiator according to a variation of a first exemplary embodiment of the present invention.

Referring to FIG. 8, the vehicle radiator 200 according to a variation of a first exemplary embodiment of the present invention includes a first header tank 210, a second header tank 220, first and second tubes 230 and 240, heat diffusion fins 250, an oil cooler 260, and a condenser 270, and the vehicle radiator 200 is formed in the same configuration and structure as those of the foregoing first exemplary embodiment, and hereinafter, a detailed description of a configuration, structure, and function thereof will be omitted.

Here, in the vehicle radiator 200 according to a variation of a first exemplary embodiment of the present invention, at a position at which the first header tank 210 is moved to the engine compartment side further than the second header tank 220, the first header tank 210 may be disposed asymmetrically to the second header tank 220, compared with the foregoing first exemplary embodiment.

Accordingly, as the vehicle radiator 200 according to a variation of a first exemplary embodiment of the present invention reduces a gap G between the first tube 230 and the second tube 240, compared with the foregoing first exemplary embodiment, package can be reduced through width size reduction of the radiator 200 in a thickness direction of the radiator.

Hereinafter, a second exemplary embodiment of the present invention is described with reference to FIG. 9 to FIG. 16.

Figure 9:
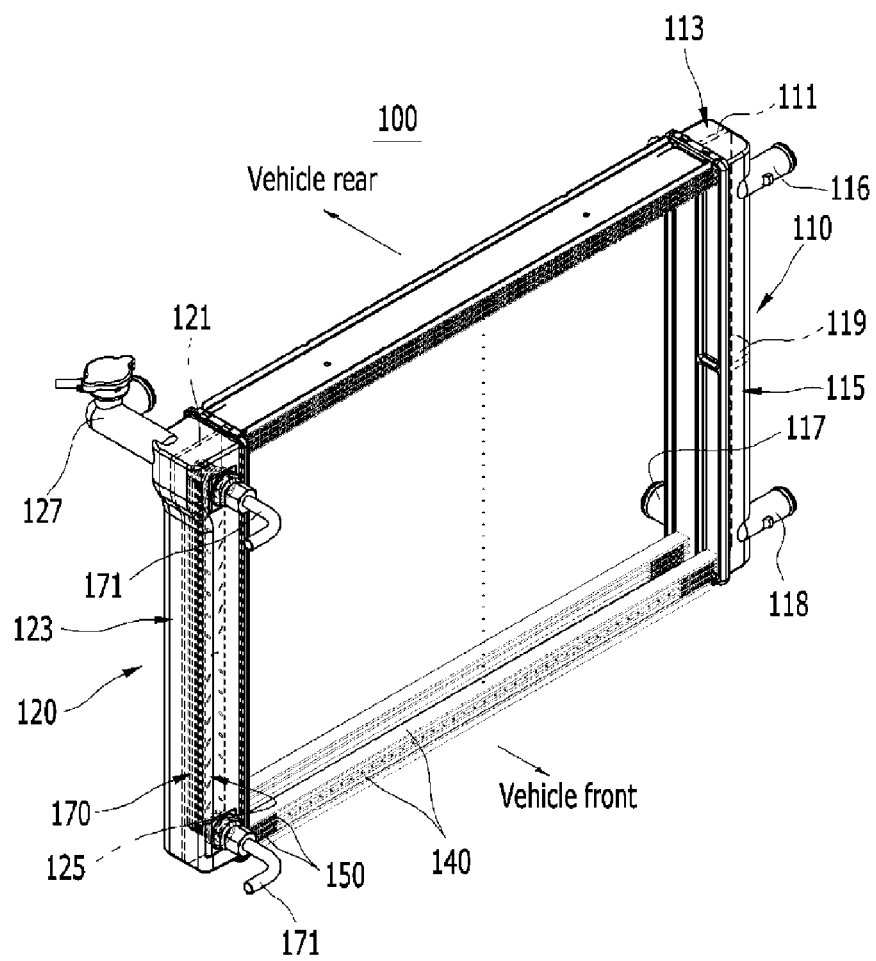
FIG. 9 is a front perspective view of a vehicle radiator according to various exemplary embodiments of the present invention.
Figure 10:
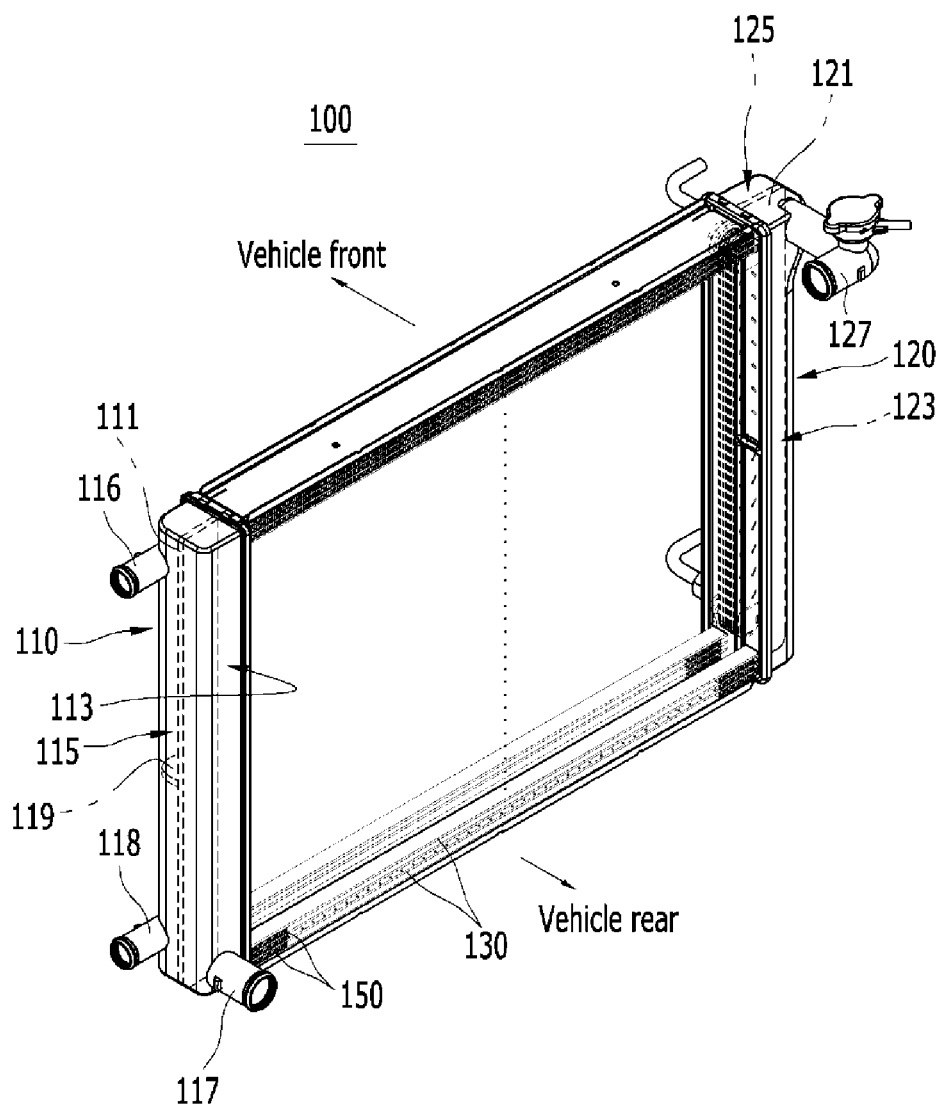
FIG. 10 is a rear perspective view of a vehicle radiator according to various exemplary embodiments of the present invention.
Figure 11:
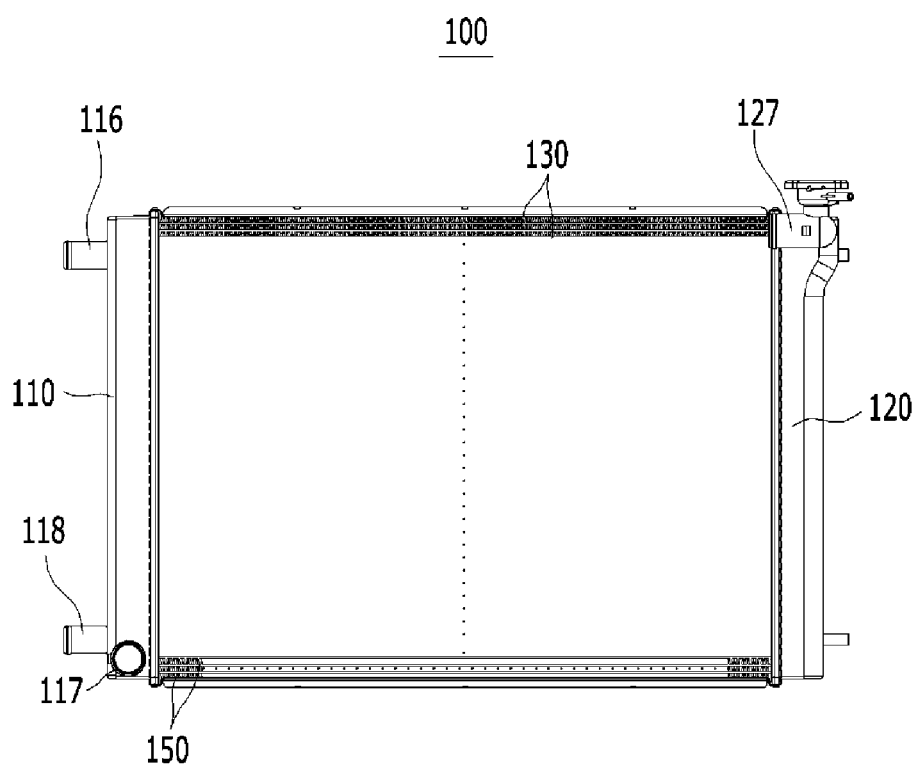
FIG. 11 is a front view of a vehicle radiator according to various exemplary embodiments of the present invention.
Figure 12:
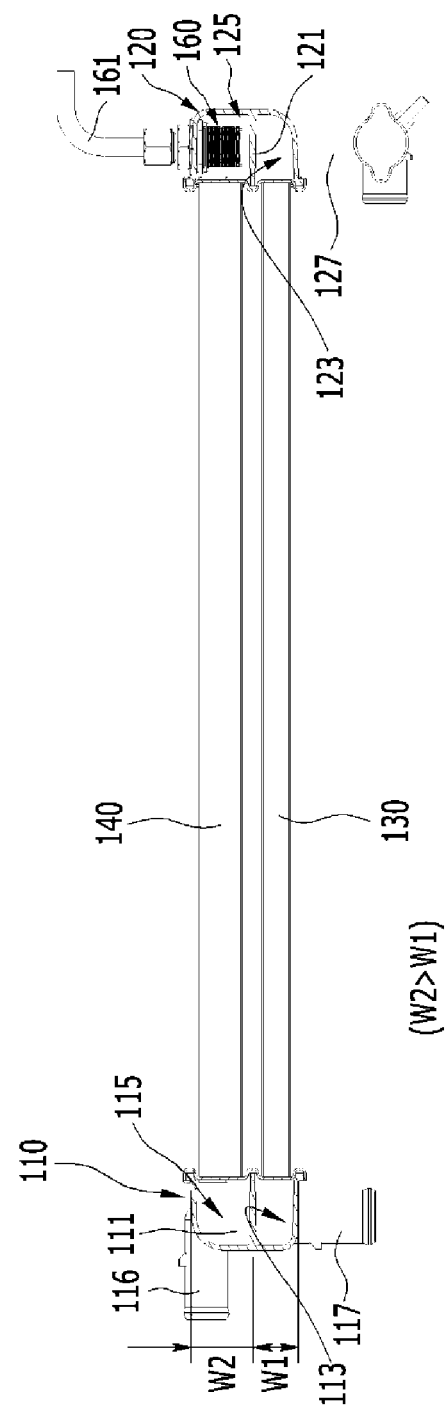
FIG. 12 is a top plan view of a vehicle radiator according to various exemplary embodiments of the present invention.
Figure 13:
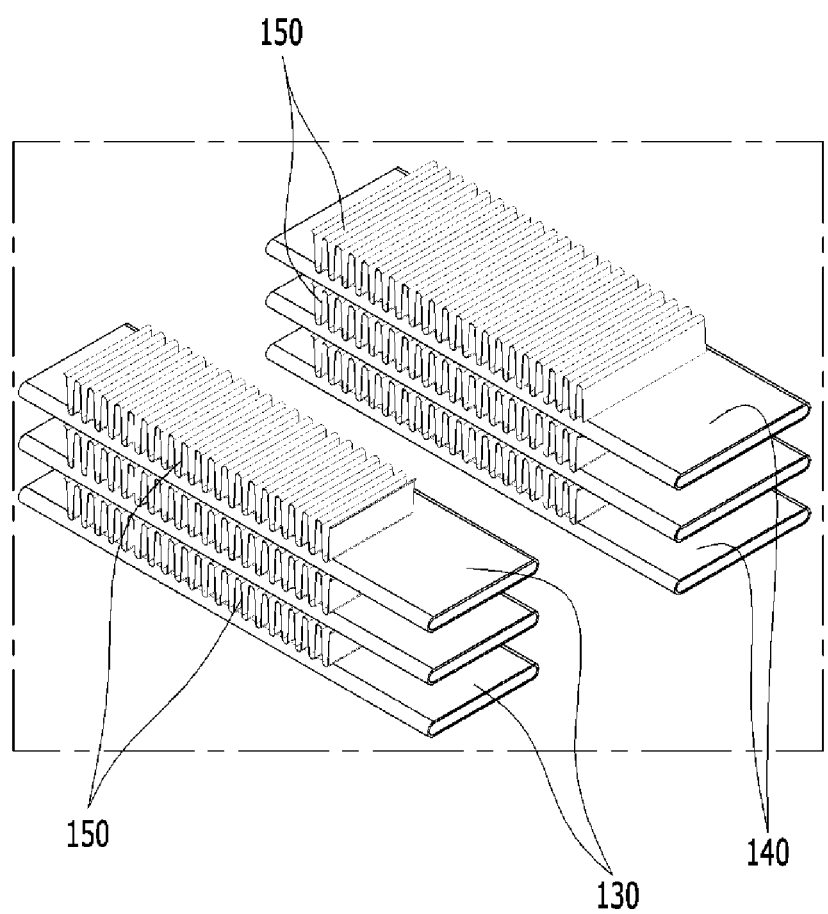
FIG. 13 is a perspective view illustrating a disposition state of tubes and heat diffusion fins in a vehicle radiator according to various exemplary embodiments of the present invention.

FIG. 9 and FIG. 10 are front and rear perspective views of a vehicle radiator according to a second exemplary embodiment of the present invention, FIG. 11 and FIG. 12 are a front view and a top plan view of a vehicle radiator according to a second exemplary embodiment of the present invention, and FIG. 13 is a perspective view illustrating a disposition state of tubes and heat diffusion fins in a vehicle radiator according to a second exemplary embodiment of the present invention.

Referring to the drawings, a vehicle radiator 100 according to a second exemplary embodiment of the present invention is formed in an integral form to supply a coolant by partitioning the inside of one header tank and has a condenser 170 that condenses a refrigerant at the inside of one header tank and thus vehicle package is reduced, and by disposing tubes in which each coolant is flowed on the same line, ventilation resistance is reduced and thus the vehicle radiator 100 has a structure that can improve a heat releasing performance.

For this purpose, the vehicle radiator 100 according to a second exemplary embodiment of the present invention is formed at the front side of the vehicle cools a coolant that is flowed at the inside through outdoor air that is injected while traveling and wind that is ventilated from a cooling fan that is mounted at the non-illustrated engine compartment side.

The vehicle radiator 100 includes a first header tank 110, a second header tank 120, first and second tubes 130 and 140, heat diffusion fins 150, and a condenser 170, as shown in FIG. 9 to FIG. 12.

First, the first header tank 110 is partitioned through a first barrier rib 111 that is monolithically formed at the inside so as to store a coolant and thus a first chamber 113 and a second chamber 115 are formed.

In the first header tank 110, a coolant is injected into the first and second chambers 113 and 115 or is exhausted from the first and second chambers 113 and 115.

Here, in the first header tank 110, in a lower portion of the rear side of the first chamber 113, a first outlet 117 that exhausts a coolant that is injected into the first chamber 113 is formed.

Further, in the first header tank 110, a second inlet 116 that injects a coolant and a second outlet 118 that exhausts a coolant are formed in an upper portion and a lower portion, respectively, of the outside of the second chamber 115 in a width direction of the radiator.

In the present exemplary embodiment, the second header tank 120 is disposed apart by a predetermined gap from the first header tank 110 and is partitioned through a second barrier rib 121 that is integrally formed at the inside to correspond to the first barrier rib 111, and a third chamber 123 and a fourth chamber 125 are thus formed.

The second header tank 120 exhausts a coolant that is injected into the third chamber 123 to the first chamber 113 of the first header tank 110, injects a coolant that is injected into the second chamber 115 of the first header tank 110 into the fourth chamber 125, and exhausts a coolant from the fourth chamber 125 to the second chamber 115.

Here, the second header tank 120 has a first inlet 127 that injects a coolant into the third chamber 123 in an upper portion of the rear side of the third chamber 123.

In the present exemplary embodiment, the first header tank 110 is integrally formed with a diaphragm 119 that prevents a coolant that is injected into the second chamber 115 from mixing with a coolant that is injected from the fourth chamber 125 into the second chamber 115 by partitioning the second chamber 115 in a vertical direction between the second inlet 116 and the second outlet 118.

Accordingly, a coolant that is injected into the second inlet 116 is prevented from being directly exhausted to the second outlet 118 by the diaphragm 119.

In such first header tank 110 and second header tank 120, the first chamber 113 and the third chamber 123 may be disposed toward a rear of the vehicle, and the second chamber 115 and the fourth chamber 125 may be disposed toward a front of the vehicle.

In the present exemplary embodiment, the second chamber 115 and the fourth chamber 125 may be formed of a same width W2 in a thickness direction of the radiator, and the first chamber 113 and the third chamber 115 may be formed of a same width W2 in a thickness direction of the radiator, where the width W2 of the second and fourth chambers 123 and 125 may be larger than the width W1 of the first and third chambers 113 and 115.

Here, the width W2 of the second and fourth chambers 123 and 125 may be about 18 mm, and the width W1 of the first and third chambers 113 and 115 may be about 14 mm.

In the present exemplary embodiment, the first tube 130 connects the first chamber 113 of the first header tank 110 and the third chamber 123 of the second header tank 120.

The second tube 140 connects the second chamber 115 of the first header tank 110 and the fourth chamber 125 of the second header tank 120.

The first tube 130 and the second tube 140 are mounted in plural in a vertical direction at a separated position of each inside surface of the first header tank 110 and the second header tank 120.

Here, the first tube 130 and the second tube 140 are mounted apart by a uniform gap in a vertical direction of the first header tank 110 and the second header tank 120.

In addition, the width of the second tube 140 may be different from that of the first tube 130, depending on cooling performance of the engine, capacity of an intercooler, or required cooling performance of an air conditioner, and is larger than that of the first tube 130 in the present exemplary embodiment.

Accordingly, a coolant that passes through the second tube 140 is flowed with a much flow quantity than that of a coolant that is flowed through the first tube 130.

In the present exemplary embodiment, it is described that a width of the second tube 140 is formed longer than that of the first tube 130 and a flow quantity of a coolant is differently flowed, but the present invention is not limited thereto and a length of each of the tubes 130 and 140 may be changed and applied according to a heat releasing request amount of an engine and an intercooler and thus a flow quantity of a flowed coolant can be adjusted.

Here, the first tube 130 and the second tube 140 connect the corresponding first and third chambers 113 and 123 in a vertical direction of the first header tank 110 and the second header tank 120, and are disposed on the same line while connecting the second and fourth chambers 115 and 125, respectively.

In the present exemplary embodiment, a coolant that is injected into the second chamber 115 through the second inlet 116 is flowed to the fourth chamber 125 through the second tube 140 in an upper portion based on the diaphragm 119, and in a lower portion, a coolant that is injected into the second chamber 115 through the second inlet 116 is flowed from the fourth chamber 125 to the second chamber 115 through the second tube 140.

The heat diffusion fins 150 are formed between the first tubes 130 and the second tubes 140 to emit a heat transferred from a coolant that is flowed through the first tube 130 and the second tube 140 to the outside, as shown in FIG. 13.

Here, the heat diffusion fins 150 are disposed to have the same bent position between the each first tube 130 and the each second tube 140.

The heat diffusion fins 150 each are separately mounted in the first tube 130 and the second tube 140 in an individually separated state to correspond to the each first tube 130 and the each second tube 140 that are separated in a thickness direction of the radiator.

That is, in the present exemplary embodiment, the first and second tubes 130 and 140 are disposed on the same line in a vertical direction of the radiator at a separated position in a front-rear direction of the vehicle according to each of the chambers 113, 115, 123, and 125 between the first header tank 110 and the second header tank 120.

The heat diffusion fins 150 are disposed to have the same bent position between the first tubes 130 and between the second tubes 140.

Accordingly, while the vehicle travels, when injected outdoor air is injected into the radiator 100 and passes through the radiator 100, ventilation resistance of outdoor air is decreased and thus outdoor air is more smoothly flowed. Therefore, an entire heat releasing performance of the radiator 100 is improved and thus cooling efficiency of the coolant can be improved.

Figure 14:
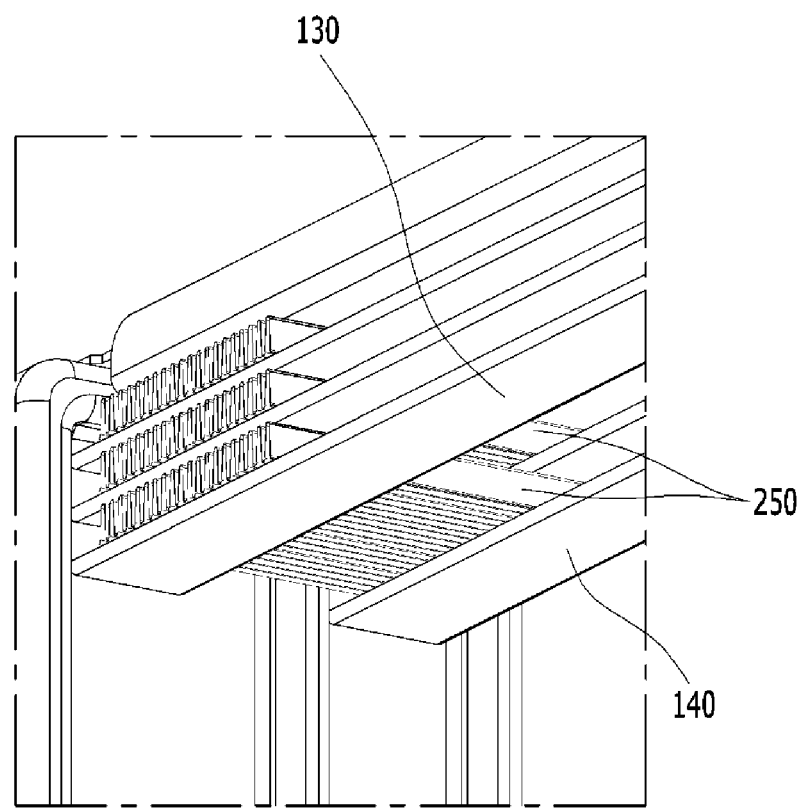
FIG. 14 is a perspective view illustrating a disposition state of tubes and heat diffusion fins in a vehicle radiator according to a variation of various exemplary embodiments of the present invention.

FIG. 14 is a perspective view illustrating a disposition state of tubes and heat diffusion fins in a vehicle radiator according to a variation of a second exemplary embodiment of the present invention.

Referring to FIG. 14, the heat diffusion fin 250 according to an exemplary variation of the second exemplary embodiment of the present invention may connect each of the first tubes 130 and each of the second tubes 140 separated in thickness direction of the radiator.

That is, in an exemplary variation of a second exemplary embodiment of the present invention, the heat diffusion fin 250 may be commonly shared by the first tube 130 and the second tube 140, so as to improve easiness in installation.

The condenser 170 is provided at the inside of the fourth chamber 125 that is disposed toward the front side of the vehicle in the second header tank 120.

The condenser 170 is provided at the inside of the fourth chamber 125 having a large width W2 to circulate a refrigerant that is supplied from a non-illustrated compressor through a refrigerant pipe 171, and the condenser 170 condenses the refrigerant through heat exchange with a coolant that passes through the fourth chamber 125.

Here, the condenser 170 exchanges a heat with a refrigerant that is circulated at the inside through a cooled coolant that is injected from the second chamber 115 and that is injected into the fourth chamber 125 in a state that exchanges a heat with outdoor air while passing through the second tube 140.

The refrigerant that is cooled and condensed through the condenser 170 is supplied to an evaporator and is circulated by injecting again into the condenser 170 via a compressor from the evaporator.

Here, the second chamber 115 and the fourth chamber 125 are formed wider than the first chamber 113 and the third chamber 115, and are connected by the second tubes 140 wider than the first tubes 130. Thus, a flow quantity of a flowed coolant increases and thus cooling efficiency of the condenser 170 that is installed within the fourth chamber 125 can be improved In the radiator 100 that is formed in this way, a coolant that is cooled through heat exchange with outdoor air while passing through the each first tube 130 between the first chamber 113 and the third chamber 123 may be circulated to an engine of a non-illustrated internal combustion engine vehicle, an engine of a hybrid vehicle, or a driving part of an environmentally-friendly vehicle.

A coolant that is cooled through heat exchange with outdoor air while passing through the each second tube 140 between and the second chamber 115 and the fourth chamber 125 may be circulated to an intercooler of a non-illustrated internal combustion engine vehicle or an electric power part of an environmentally-friendly vehicle.

That is, the vehicle radiator 100 according to an exemplary embodiment of the present invention may be formed to supply a coolant to an engine and an intercooler in an internal combustion engine vehicle, and in an environmentally-friendly vehicle such as an electric vehicle and a hybrid vehicle, as the vehicle radiator 100 has a configuration to supply a coolant to a driving part and an electrical equipment, the vehicle radiator 100 can be applied to both the vehicle of the internal combustion engine and the environmentally-friendly vehicle.

Hereinafter, an operation and function of the vehicle radiator 100 according to a second exemplary embodiment of the present invention will be described.

Figure 15:
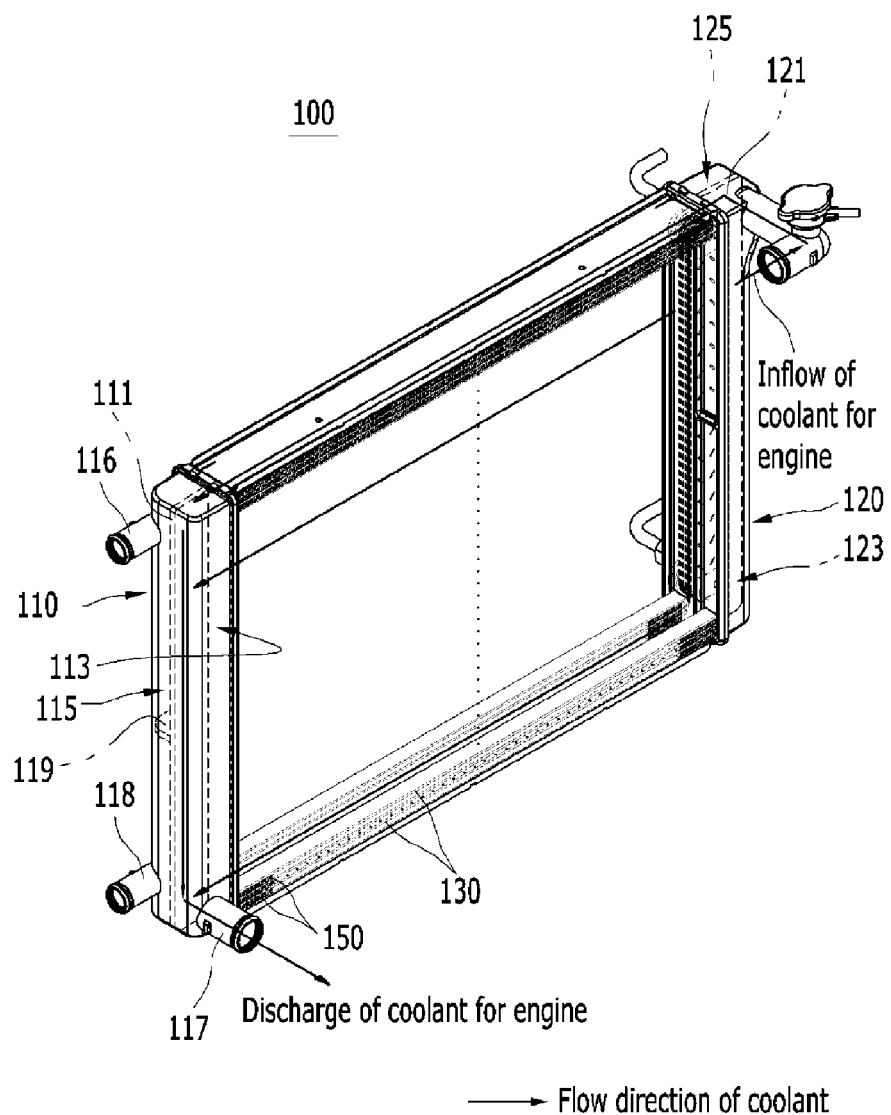
FIG. 15 and FIG. 16 are perspective views illustrating a flow of each coolant in a vehicle radiator according to a variation of various exemplary embodiments of the present invention.
Figure 16:
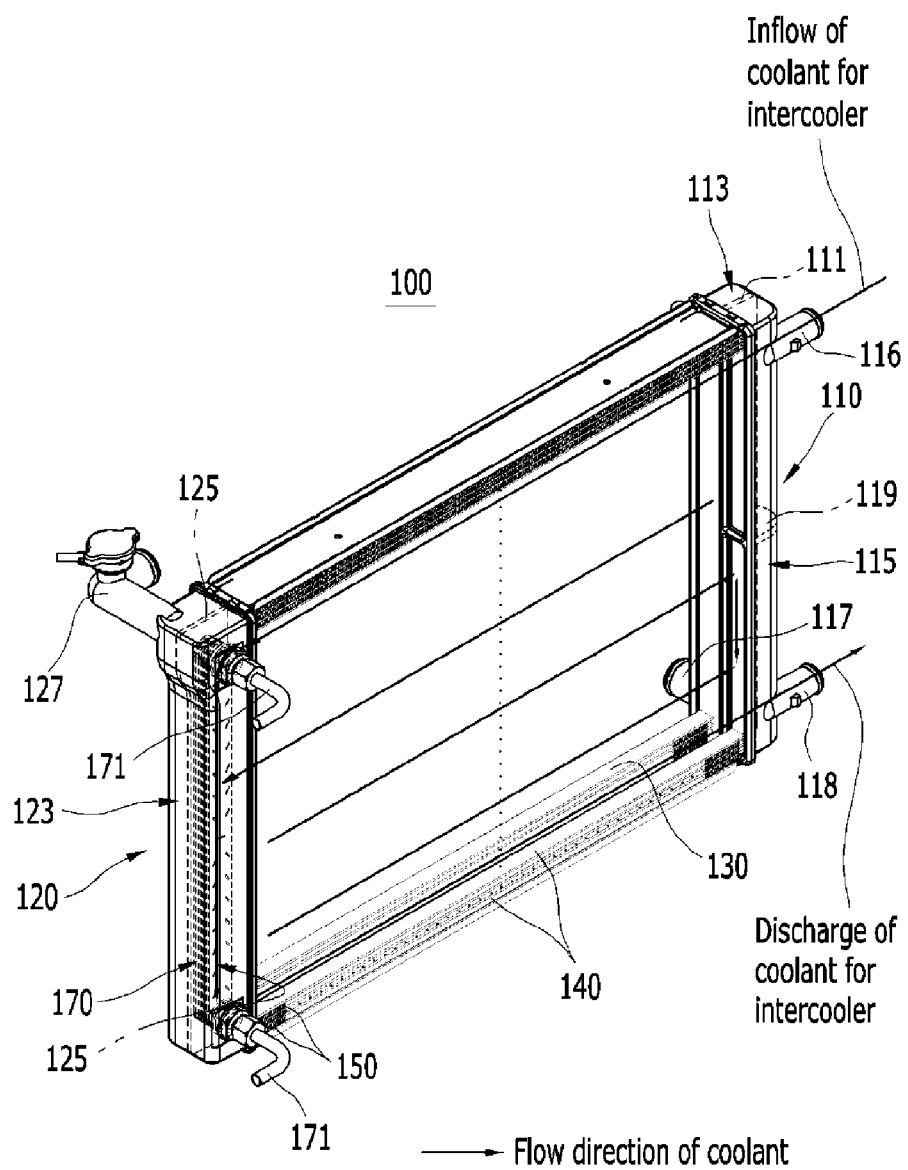

FIGS. 15 and 16 are perspective views illustrating a flow of a coolant in a vehicle radiator according to a second exemplary embodiment of the present invention.

Referring to FIG. 15, a coolant that cools an internal combustion engine, an engine of a hybrid vehicle, or a driving part of an environmentally-friendly vehicle is injected into the third chamber 123 through a first inlet 127 that is formed in an upper portions of the third chamber 123 of the second header tank 120.

Such a coolant is cooled through heat exchange with outdoor air while being flowed to the first chamber 113 along the first tubes 130 from the third chamber 123 and is again supplied to an engine of an internal combustion engine or a driving part of an environmentally-friendly vehicle through the second outlet 117 that is formed in a lower portion of the first chamber 113 of the first header tank 110.

A coolant that cools an intercooler or an electrical equipment of the environmentally-friendly vehicle is injected into the second inlet 116 that is formed in an upper portion of the second chamber 115 of the first header tank 110, as shown in FIG. 16.

The coolant that is injected into the second inlet 116 is injected into the fourth chamber 125 in a state that is firstly cooled through heat exchange with outdoor air along the second tubes 140 from an upper portion of the second chamber 115 to the diaphragm 119.

The coolant that is injected into the fourth chamber 125 condenses the refrigerant while exchanging a heat with a refrigerant that passes through the inside of the condenser 170 that is provided at the inside of the fourth chamber 125.

Thereafter, the coolant is secondarily cooled through heat exchange with outdoor air while being flowed again from the fourth chamber 125 to the second chamber 115 along the second tubes 140 that are positioned in a lower portion based on the diaphragm 119 of the second chamber 115.

The coolant in which cooling complete, which is injected into the second chamber 115 is exhausted through the second outlet 118 that is positioned in a lower portion of the second chamber 115 and is again supplied to the intercooler or the electrical equipment of the environmentally-friendly vehicle.

That is, each coolant that cools the engine and the intercooler, or the driving part and the electrical equipment of the environmentally-friendly vehicle is cooled through heat exchange with outdoor air while repeatedly performing the foregoing operation.

Here, the first and second tubes 130 and 140 each are disposed on the same line, and bent positions of the heat diffusion fins 150 that are positioned between the tubes 130 and 140 are the same and thus ventilation resistance is decreased, and outdoor air is thus more smoothly injected into the radiator 100.

Accordingly, a heat releasing performance of the radiator 100 is improved by smooth injection of outdoor air according to reduction of ventilation resistance of outdoor air.

Therefore, when the vehicle radiator 100 according to a second exemplary embodiment of the present invention having the foregoing configuration is applied, by partitioning the inside of the first and second header tanks 110 and 120 so as to form two chambers in respective tanks, by forming the vehicle radiator 100 in an integral form so as to supply each coolant to the engine and the intercooler, and by installing a condenser that condenses a refrigerant at the inside of the fourth chamber 125 of the second header tank 120, vehicle package can be reduced, and a weight and a size thereof can be reduced.

Further, the radiator 100 improves space use of the inside of an engine compartment through package reduction, and by securing enough space between a back beam and the engine compartment, a collision performance can be improved.

Further, as the first tubes 130 and the second tubes 140 are disposed at the same line along thickness direction of the radiator while connecting corresponding chambers 113, 115, 123, and 125, respectively, when outdoor air is injected, ventilation resistance is reduced and thus an entire heat releasing performance can be improved.

Further, by cooling the coolant to a request temperature through improvement of a heat releasing performance of the radiator 100, a cooling performance of the engine and the intercooler can be improved without enlargement of a size and a capacity.

For convenience in explanation and accurate definition in the appended claims, the terms "upper", "lower", "inner" and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. They are not intended to be exhaustive or to limit the invention to the precise forms disclosed, and obviously many modifications and variations are possible in light of the above teachings as well as various alternatives and modifications thereof. It is intended that the scope of the invention be defined by the Claims appended hereto and their equivalents.

What is claimed is:

1. A vehicle radiator to cool a coolant that is flowed at an inside through heat exchange with outdoor air, the vehicle radiator comprising:
   a first header tank that is partitioned through a first barrier rib that is integrally formed at the inside so as to store a coolant to form a first chamber and a second chamber inside the first header tank,
      wherein the first header is configured to inject a coolant into the first chamber and the second chamber or to exhaust a coolant from the first chamber and the second chamber;
   a second header tank that is disposed apart by a predetermined gap from the first header tank and that is partitioned through a second barrier rib that is integrally formed therein to correspond to the first barrier rib to form a third chamber and a fourth chamber,
      wherein the second header tank is configured to inject a coolant into the third chamber and the fourth chamber from the first header tank or to exhaust a coolant from the first header tank to the third chamber and the fourth chamber;
   a plurality of first and second tubes that are mounted in a vertical direction at each separated position of each inside surface of the first header tank and the second header tank,
      wherein the plurality of first and second tubes are configured to connect the first chamber of the first header tank and the third chamber of the second header tank and to connect the second chamber of the first header tank and the fourth chamber of the second header tank;
   heat diffusion fins, each of which are formed between the first tubes and the second tubes; and
   a condenser that is provided at the inside of the fourth chamber in the second header tank,
      wherein the condenser is configured to circulate a refrigerant through a refrigerant pipe and to condense the refrigerant through heat exchange with a coolant that passes through the fourth chamber,
      wherein the first header tank is disposed asymmetrically to the second header tank at a position that is moved to an engine compartment side further than the second header tank so as to reduce a gap between the first tubes and the second tubes.

2. The vehicle radiator of claim 1, further comprising:
   an oil cooler that is provided at the inside of the first chamber in the first header tank and that is connected to an automatic transmission through an oil pipe to circulate transmission oil and that cools the transmission oil through heat exchange with a coolant that passes through the first chamber,
   wherein the first chamber and the second chamber are partitioned in different sizes, and
   wherein the third chamber and the fourth chamber are partitioned in different sizes.

3. The vehicle radiator of claim 1,
wherein the first chamber is formed in larger width than a width of the second chamber, along a thickness direction of the radiator, and
wherein the fourth chamber is formed in a larger width than a width of the third chamber, along a thickness direction of the radiator.

4. The vehicle radiator of claim 1, wherein the second chamber and the third chamber are formed in a same width along a thickness direction of the radiator, and the first chamber and the fourth chamber are formed in a same width along a thickness direction of the radiator.

5. The vehicle radiator of claim 1,
wherein the first and third chambers are formed in a same width along a thickness direction of the radiator, and the second and fourth chambers are formed in a same width along a thickness direction of the radiator, and
wherein the width of the second and fourth chambers is larger than the width of the first and third chambers.

6. The vehicle radiator of claim 1, wherein the second tubes are formed in a width different from a width of the first tube.

7. The vehicle radiator of claim 1, wherein the first header tank has a first outlet that exhausts a coolant that is injected into the first chamber in a lower portion of the first chamber.

8. The vehicle radiator of claim 1, wherein the second header tank has a first inlet that injects a coolant into the third chamber in an upper portion of the third chamber.

9. The vehicle radiator of claim 1, wherein the first header tank has a second inlet and a second outlet that inject and exhaust a coolant in an upper portion and a lower portion, respectively, of the second chamber.

10. The vehicle radiator of claim 9, wherein in the first header tank, a diaphragm that prevents mixing of a coolant that is injected into the second chamber by partitioning the second chamber in a vertical direction is integrally formed between the second inlet and the second outlet.

11. The vehicle radiator of claim 10, wherein the coolant that is injected into the second chamber is flowed to the fourth chamber through the second tubes in an upper portion based on the diaphragm and is flowed from the fourth chamber to the second chamber through the second tubes in a lower portion.

12. The vehicle radiator of claim 1, wherein each of the first tubes and each of the second tubes are disposed on a same line in a vertical direction of the first header tank and the second header tank.

13. The vehicle radiator of claim 1, wherein the heat diffusion fins are disposed to have a same bent position between the first tubes and between the second tubes.

14. The vehicle radiator of claim 1, wherein the heat diffusion fins each are mounted in the first tubes and the second tubes in a state that are separated to correspond to each of the first tubes and each of the second tubes that are separated in a thickness direction of the radiator.

15. The vehicle radiator of claim 1, wherein the heat diffusion fins interconnect each of the first tubes and each of the second tubes separated in a thickness direction of the radiator.

16. The vehicle radiator of claim 1, wherein the coolant that is cooled while flowing in the first chamber and the third chamber is circulated to an engine of an internal combustion engine vehicle, an engine of a hybrid vehicle, or a driving part of an environmentally-friendly vehicle.

17. The vehicle radiator of claim 1, wherein the coolant that is cooled while flowing in the second chamber and the fourth chamber is circulated to an intercooler of an internal combustion engine vehicle or an electric power part of an environmentally-friendly vehicle.

18. A vehicle radiator to cool a coolant that is flowed at an inside through heat exchange with outdoor air, the vehicle radiator comprising:
a first header tank that is partitioned through a first barrier rib that is integrally formed at the inside so as to store a coolant to form a first chamber and a second chamber inside the first header tank,
wherein the first header is configured to inject a coolant into the first chamber and the second chamber or to exhaust a coolant from the first chamber and the second chamber;
a second header tank that is disposed apart by a predetermined gap from the first header tank and that is partitioned through a second barrier rib that is integrally formed therein to correspond to the first barrier rib to form a third chamber and a fourth chamber,
wherein the second header tank is configured to inject a coolant into the third chamber and the fourth chamber from the first header tank or to exhaust a coolant from the first header tank to the third chamber and the fourth chamber;
a plurality of first and second tubes that are mounted in a vertical direction at each separated position of each inside surface of the first header tank and the second header tank,
wherein the plurality of first and second tubes are configured to connect the first chamber of the first header tank and the third chamber of the second header tank and to connect the second chamber of the first header tank and the fourth chamber of the second header tank;
heat diffusion fins, each of which are formed between the first tubes and the second tubes;
a condenser that is provided at the inside of the fourth chamber in the second header tank,
wherein the condenser is configured to circulate a refrigerant through a refrigerant pipe and to condense the refrigerant through heat exchange with a coolant that passes through the fourth chamber; and
an oil cooler that is provided at the inside of the first chamber in the first header tank and that is connected to an automatic transmission through an oil pipe to circulate transmission oil and that cools the transmission oil through heat exchange with a coolant that passes through the first chamber,
wherein the first chamber and the second chamber are partitioned in different sizes, and
wherein the third chamber and the fourth chamber are partitioned in different sizes.

* * * * *